(12) United States Patent
Nishida (10) Patent No.: US 6,985,302 B2
(45) Date of Patent: Jan. 10, 2006

(54) PROJECTION ZOOM LENS AND OPTICAL PROJECTOR PROVIDED WITH THE SAME

(75) Inventor: Kazuhiro Nishida, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 113 days.

(21) Appl. No.: 10/765,047

(22) Filed: Jan. 28, 2004

(65) Prior Publication Data

US 2004/0257644 A1    Dec. 23, 2004

(30) Foreign Application Priority Data

Feb. 10, 2003    (JP) .............................. 2003-032636

(51) Int. Cl.
*G02B 15/14* (2006.01)

(52) U.S. Cl. ................................... 359/683
(58) Field of Classification Search ................ 359/676, 359/683
See application file for complete search history.

(56) References Cited

U.S. PATENT DOCUMENTS

| | | | |
|---|---|---|---|
| 5,229,886 A * | 7/1993 | Tanaka ........................ 359/683 |
| 5,631,775 A * | 5/1997 | Shibata ........................ 359/683 |
| 5,739,960 A * | 4/1998 | Tanaka ........................ 359/683 |
| 6,285,509 B1 * | 9/2001 | Nakayama et al. ......... 359/676 |
| 6,687,059 B2 * | 2/2004 | Mihara ........................ 359/681 |

FOREIGN PATENT DOCUMENTS

| | | |
|---|---|---|
| JP | A 2000-206409 | 7/2000 |
| JP | A 2001-311872 | 11/2001 |

\* cited by examiner

*Primary Examiner*—Scott J. Sugarman
(74) *Attorney, Agent, or Firm*—Oliff, Berridge, PLC

(57) ABSTRACT

A projection zoom lens comprises a first lens group having a negative refracting power and including a single meniscus lens having an aspherical surface facing an object surface, a second lens group having positive refracting power and including a single second-group lens, a third lens group having negative refracting power and including a compound lens, a fourth lens group including a single fourth-group lens, and a fifth lens group having positive refracting power and including a single fifth-group lens. The fifth lens group is kept stationary, and the first, the second, the third and the fourth lens group are shifted on the optical axis toward the screen to increase the magnification of the projection zoom lens.

6 Claims, 8 Drawing Sheets

(a) WIDE-ANGLE POSITION (b) MEDIUM-ANGLE POSITION (c) TELEPHOTO POSITION

|  | RDY | THI | GLA |
|---|---|---|---|
| OBJ: | INFINITY | ※ 1 | |
| 1: | 63.23698 | 1.000000 | 583130.594609 |
| 2: | 13.30225 | ※ 2 | |

ASP:
K  :   0.000000

A  : -.270879E-04   B : -.267940E-06   C : 0.164953E-08   D : -.139868E-10

|  | RDY | THI | GLA |
|---|---|---|---|
| STO: | INFINITY | 0.200000 | |
| 4: | 26.03063 | 4.925835 | 834469.365407 |
| 5: | -190.75264 | ※ 3 | |
| 6: | -19.50592 | 6.000000 | 799110.251256 |
| 7: | 24.30030 | 5.327179 | 484530.701000 |
| 8: | -33.99213 | ※ 4 | |

ASP:
K  :   0.000000

A  : 0.151727E-04   B : 0.119217E-07   C : 0.156057E-09   D : -.470482E-12

|  | RDY | THI | GLA |
|---|---|---|---|
| 9: | 113.36301 | 5.903469 | 740882.483218 |
| 10: | -28.16070 | ※ 5 | |
| 11: | 41.03839 | 6.000000 | 713000.539000 |
| 12: | 205.88571 | | |
| 13: | INFINITY | 20.000000 | |
| 14: | INFINITY | 1.700000 | |
| 15: | INFINITY | 1.000000 | |
| 16: | INFINITY | 1.000000 | |
| 17: | INFINITY | 3.000000 | |
| 18: | INFINITY | 0.608714 | |
| IMG: | INFINITY | 1.032917 | |

ZOOM DATA

|  | wide | normal | Tele |
|---|---|---|---|
| ※ 1 | 1800.00000 | 1799.39916 | 1798.00000 |
| ※ 2 | 27.20167 | 23.47649 | 19.97107 |
| ※ 3 | 12.98601 | 13.65120 | 14.44929 |
| ※ 4 | 0.94348 | 1.70403 | 2.49906 |
| ※ 5 | 0.20000 | 3.09727 | 6.41474 |

PROJECTION ZOOM LENS AND OPTICAL PROJECTOR PROVIDED WITH THE SAME

BACKGROUND OF THE INVENTION

1. Field of the Invention

The present invention relates to a projection zoom lens suitable for a projector for projecting an image formed on a film or slide or displayed by a liquid crystal display or the like on a screen in an enlarged image, and an optical projector provided with the projection zoom lens.

2. Description of the Related Art

An optical projector for projecting an image formed on a film or slide or displayed by a liquid crystal display or the like on a screen in an enlarged image has a projection optical system including a telecentric zoom lens. Most projection zoom lenses are four-group or five-group zoom lenses having variable-power ratios on the order of 1.2. In increasing the focal length and hence the magnification of most standard four-group or five-group telecentric zoom lenses, the first lens group at the front end of the zoom lens on the side of a screen, and the fourth or the fifth lens group at the rear end of the zoom lens on the side of an object point are fixed, and the lens groups between the first and the fourth lens group or between the first and the fifth lens group are shifted.

The conventional four-group or five group telecentric zoom lens, such as disclosed in JP2000-206409A, needs a large number of lenses to obtain a high aberration reducing characteristic and a wide field angle. Thus, the conventional projection zoom lens needs many lenses to reduce aberrations, such as distortion and coma, to a desired level, and hence the conventional projection zoom lens is complicated in construction and costly.

SUMMARY OF THE INVENTION

Accordingly, it is an object of the present invention to provide a projection zoom lens capable of reducing problems in the conventional projection zoom lens, and of reducing aberrations satisfactorily by using a comparatively small number of lenses, and to provide an optical projector capable of forming an image of a high picture quality on a screen.

To achieve the object, the present invention provides a projection zoom lens having an optical axis comprising: a first lens group having a negative refracting power and disposed at a front end on the side of a screen; a second lens group having a positive refracting power disposed behind the first lens group; a third lens group having a negative refractive power and disposed behind the second lens group; a fourth lens group having a positive refracting power and disposed behind the third lens group; and a fifth lens group having a positive refracting power and disposed behind the fourth lens group at a back end on the side of an object point; wherein the fifth lens group is kept stationary, and the first, the second, the third and the fourth lens group are shifted along the optical axis in increasing magnification, the first lens group includes a single meniscus lens having a convex surface facing the screen and an aspherical surface facing the object point, the second lens group includes a single second-group lens having a convex surface facing the screen, the third lens group includes a biconcave third-group first lens having a negative refracting power and a biconvex third-group second lens having an aspherical surface facing the object point, having a positive refracting power and cemented to the back surface on the side of the object point of the third-group first lens, the fourth lens group includes a single fourth-group lens having a positive refracting power and having a convex surface facing the object point, and the firth lens group includes a single biconvex fifth-group lens having a positive refracting power.

In the projection zoom lens according to the present invention the first to the fifth lens group comprises six lenses virtually.

In the projection zoom lens according to the present invention, the first, the second, the third and the fourth lens group are shifted toward the screen on the optical axis in increasing magnification.

An optical projector according to the present invention comprises an image forming means for producing images; and the aforesaid projection zoom lens through which an image produced by the image forming means is projected.

According to the present invention, the surfaces of the component lenses of the projection zoom lens include the least necessary number of aspherical surfaces, and the first, the second, the third and the fourth lens group are shifted toward the screen on the optical axis with the fifth lens group kept stationary in increasing magnification. The projection zoom lens comprising a comparatively small number of component lenses is capable of satisfactorily reducing aberrations and has a wide half field angle.

BRIEF DESCRIPTION OF THE DRAWINGS

The above and other objects, features and advantages of the present invention will become more apparent from the following description taken in connection with the accompanying drawings, in which;

FIGS. 1(*a*), 1(*b*) and 1(*c*) are diagrammatic views of a projection zoom lens in a preferred embodiment according to the present invention set in a wide-angle position for the widest angle, a medium-angle position, and a telephoto position, respectively;

DESCRIPTION OF THE PREFERRED EMBODIMENTS

Figure 1:
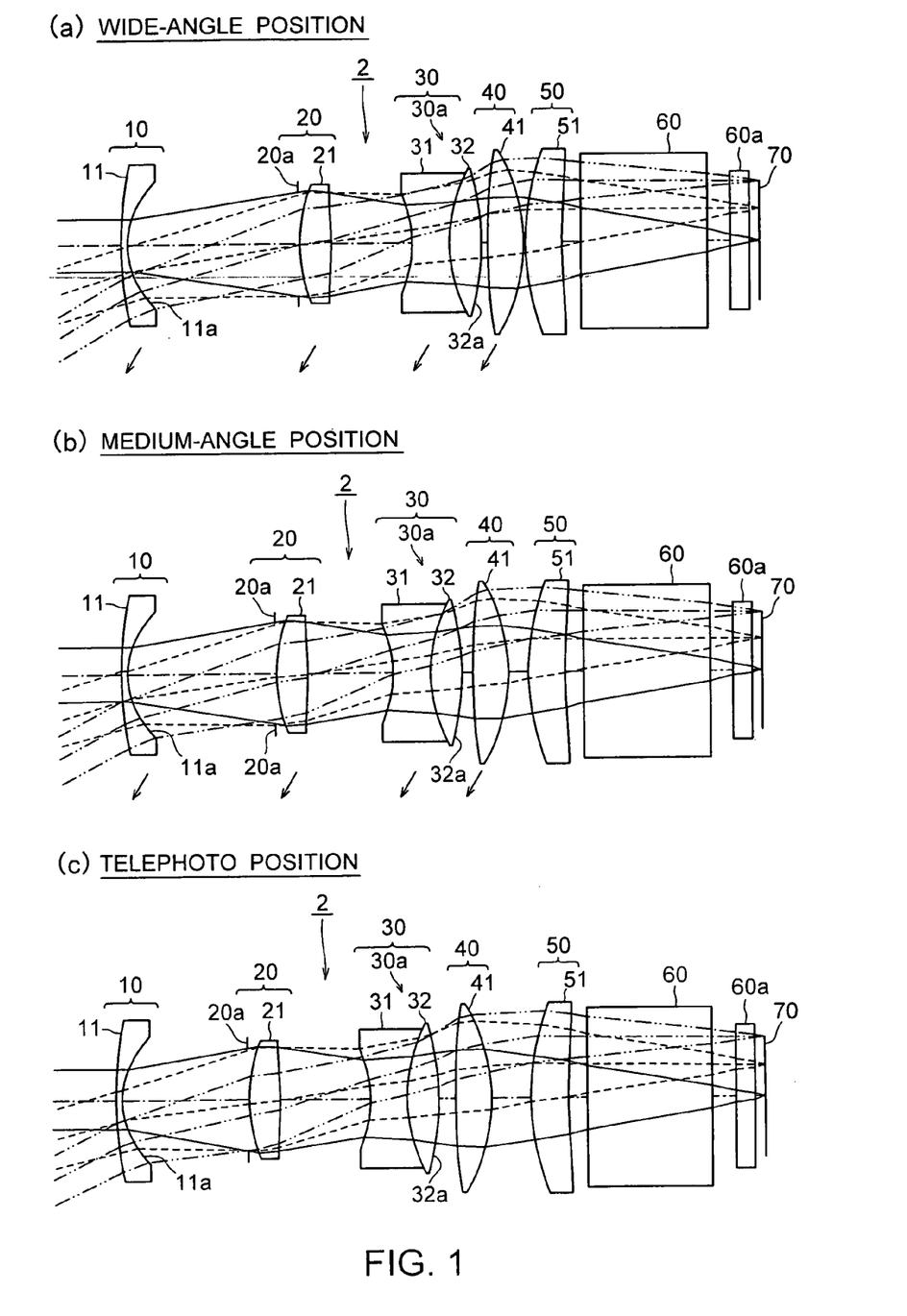
Figure 2:
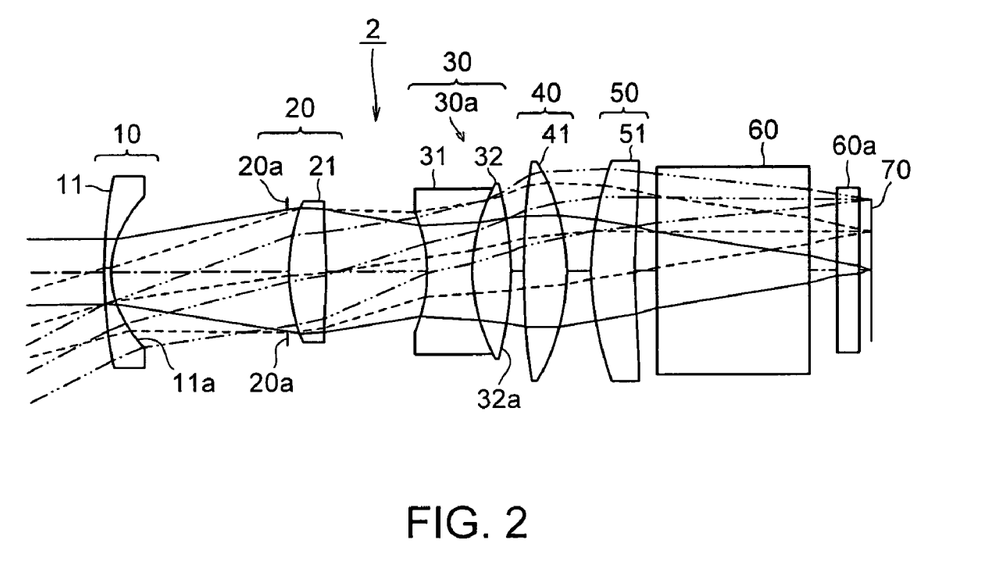
FIG. 2 is a diagrammatic view of the projection zoom lens shown in FIG. 1, showing the passages of light rays emerging from object points.

FIGS. 1(*a*), 1(*b*) and 1(*c*) shows a projection zoom lens 2 in a preferred embodiment according to the present invention set in a wide-angle position, a medium-angle position, and a telephoto position, respectively, and FIG. 2 shows the passages of light rays emerging from object points in the projection zoom lens 2 shown in FIG. 1.

Referring to FIGS. 1 and 2, the projection zoom lens 2 comprises a first lens group 10 having a negative refracting power, a second lens group 20 having a positive refracting power, a third lens group 30 having a negative refractive power, a fourth lens group 40 having a positive refracting power, and a fifth lens group 50 having a positive refracting power arranged in that order from the front end on the side of a screen, i.e., the left side as viewed in FIG. 1, toward the back end on the side of an object surface, i.e., the right side as viewed in FIG. 1. In this specification, the term "lens group" is used for designating both single lenses and compound lenses. Although the first lens group, the second lens group 20, the fourth lens group 40 and the fifth lens group 50 are single lenses actually, the same will be designated as "lens groups" herein for convenience.

The projection zoom lens 2 is substantially telecentric on the side of the object point. In FIG. 1, bundles of parallel light rays each having a principal light ray emerge from object points on an object surface 70 toward the left, and are projected through the projection zoom lens 2 on a screen. It is supposed to simplify explanation that bundles of light rays each including a principal light ray emerge from the screen and are focused on the object points on the object surface 70 by the projection zoom lens 2.

The fifth lens group 50 is kept stationary, and the first lens group 10, the second lens group 20, the third lens group 30 and the fourth lens group 40 are shifted along the optical axis in increasing magnification. Thus, the first lens group 10 is moved, and the third lens group 30 and the fourth lens group 40 are moved individually for zooming. The first lens group 10, the second lens group 20, the third lens group 30 and the fourth lens group 40 are moved toward the screen on the optical axis in increasing magnification.

The first lens group 10 is a single meniscus lens 11 having a convex spherical surface facing the screen and an aspherical surface 11*a* facing the object point. The meniscus lens 11 has a big diameter to project light rays at a large field angle on the screen. The aspherical surface 11*a* of the meniscus lens is formed so as to reduce aberrations of light rays coming from the screen and fallen on the meniscus lens 11 to the least possible extent. Since the first lens group 10 is moved for zooming, large field angles and a high aberration-reducing characteristic can be maintained for a wide magnification range between the largest and the smallest magnification despite the first lens group 10 being the single meniscus lens 11.

The second lens group 20 is a single second-group lens 21 having a convex front surface facing the screen. A diaphragm 20*a* is disposed near the front surface of the second-group lens 21. The diaphragm 20*a* and the second-group lens 21 are moved in a unit.

The third lens group 30 is a compound lens 30*a* formed by putting together a biconcave third-group first lens 31 on the side of the screen, and a biconvex third-group second lens 32 on the side of the object point having an aspherical back surface 32*a* facing the object point, and cementing the lenses 31 and 32 together. The compound lens 30*a* functions principally to correct chromatic aberration, and the third-group second lens 32 having the aspherical back surface 32*a* functions principally to correct spherical aberration.

The fourth lens group 40 is a single fourth-group lens 41. The fourth-group lens 41 and the compound lens 30*a* are moved independently in increasing magnification. The fourth-group lens 41 corrects spherical aberration in cooperation with the compound lens 30*a*. The fourth-group lens 41 is disposed close to the fifth lens group 50 to provide the projection zoom lens 2 with a telecentric characteristic in cooperation with the fifth lens group 50. Since the fourth-lens group 41 and the compound lens 30*a* are able to move independently for zooming, the fourth-group lens 41 can be freely moved relative to the compound lens 30*a* and the fifth lens group 50 to correct spherical aberration and to secure the telecentric characteristic at various magnifications by the fourth-group lens 41.

The fifth lens group 50 is a single biconvex fifth-group lens 51 having positive refracting power. The fifth lens group 50 provides the projection zoom lens 2 with a telecentric characteristic. The telecentric characteristic of the projection zoom lens 2 can be maintained form the magnification range between the smallest and the largest magnification by moving the fourth-group lens 41 relative to the fifth lens group 50.

Thus, the projection zoom lens 2 a very small number of lenses, namely, virtually six lenses.

A projection zoom lens in an example of the projection zoom lens 2 will be described.

FIGS. 1(*a*), 1(*b*) and 1(*c*) a projection zoom lens 2 in an example set in a wide-angle position for the widest angle, a medium-angle position, and a telephoto position, respectively. In this projection zoom lens 2, surfaces of a first lens group 10, a second lens group 20, a third lens group 30, a fourth lens group 40 and a fifth lens group 50, excluding aspherical surfaces 11*a* and 32*a*, are spherical.

The aspherical shapes of the surfaces 11*a* and 32*a* are expressed by Expression (1).

$$x = \frac{Ry^2}{1 + \sqrt{1 - (1+K)R^2 y^2}} + Ay^4 + By^6 + Cy^8 + Dy^{10} \quad (1)$$

Figure 3:
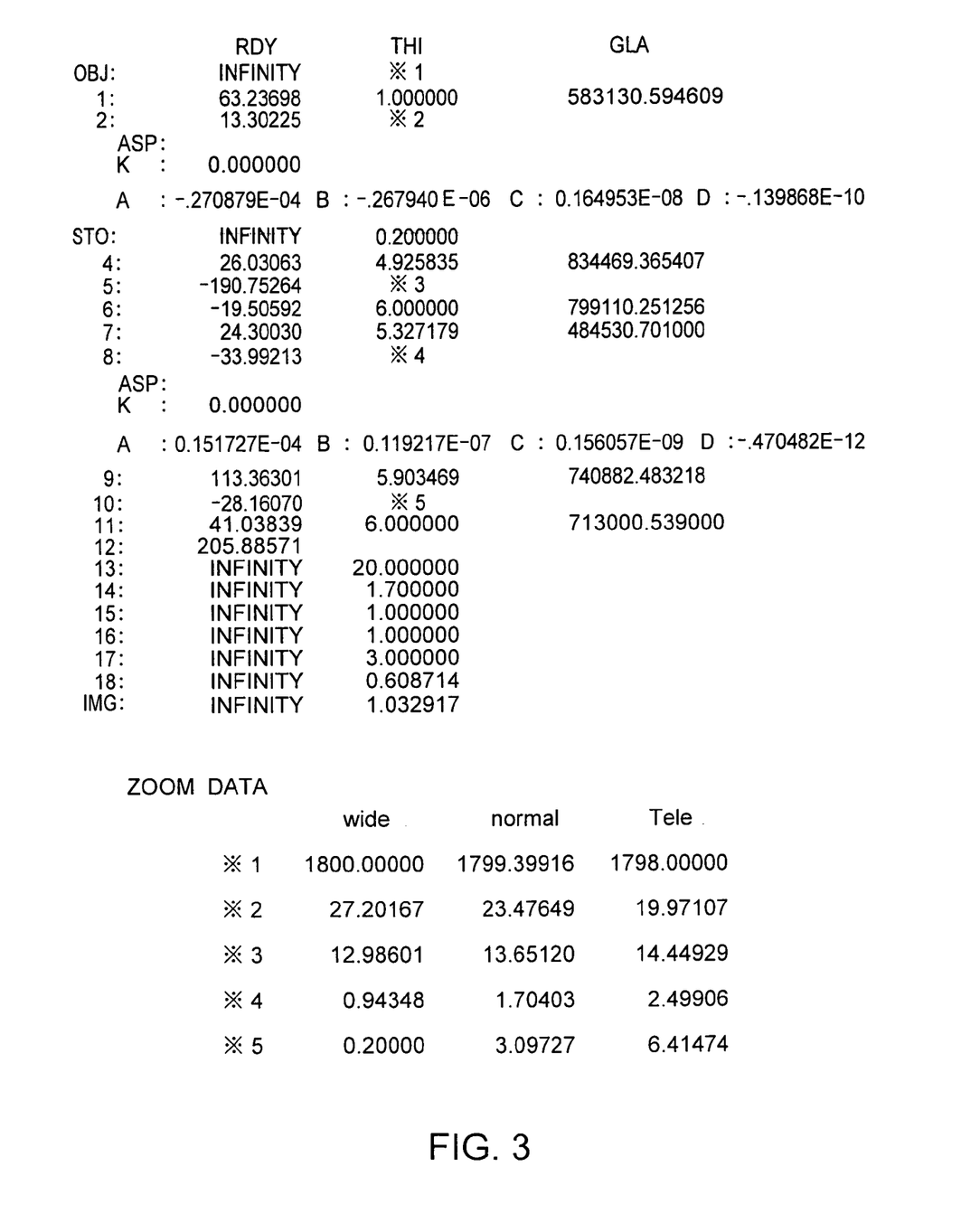
FIG. 3 is a table of data on the projection zoom lens shown in FIG. 1, in which surface numbers are shown in column OBJ, radii of curvature in millimeter of the surfaces are shown in column RDY, thicknesses of lenses or gaps between neighboring surfaces are shown in column THI, and *1, *2, *3, *4 and *5 indicate intervals between lens groups when the projection zoom lens is set in a wide-angle position for the widest angle, a medium-angle position, and a telephoto position, respectively.

In Expression (1), the value of the coefficient R for the aspherical surface 11*a* is the radius of curvature (RDY) of a surface No. 2 in column OBJ, and the values of the coefficients K, A, B, C and D are those shown between No. 2 and STO (diaphragm 20*a*) in FIG. 3. The value of the coefficient R for the aspherical surface 32*a* is the radius of curvature (RDY) of a surface No. 8, and the values of the coefficients K, A, B, C and D are those shown between Nos. 8 and 9 in FIG. 3. In the following description of the projection zoom lens 2, f denotes the focal distance of the projection zoom lens 2, and f-No. denotes f-number.

The focal distance f of the projection zoom lens 2 is variable between f=16.55 mm (wide angle position for the widest angle) and f=19.85 mm (telephoto position). The f-number of the projection zoom lens 2 is variable between f-No.=0.2 (wide angle position for the widest angle) and f-No.=2.3 (telephoto position). The half field angle θ of the projection zoom lens 2 is about 30°. The variable-power ratio of the projection zoom lens 2 is about 1.2, and the back focal distance in air of the same is 23.2 mm.

FIG. 3 shows data on the projection zoom lens 2, in which the numbers of surfaces of the lenses from the front end toward the back end are shown in column OBJ, radii of curvature of the surfaces in millimeter are shown in column RDY, and thicknesses of lenses or gaps between the neighboring surfaces in millimeter are shown in column THI. D-line refractive indices and the Abbe's numbers of materials forming the lenses are shown in column GLA. For example, GLA=583130.594609 signifies that the material forming the lens has a D-line refractive index of 1.583130 (=1+0.583130) and an Abbe's number of 59.4609.

In FIG. 3, *1 indicates intervals between a front surface of the meniscus lens 11 facing the screen and the screen when the projection zoom lens 2 is set in a wide-angle position for the widest angle, a medium-angle position, and a telephoto position, respectively, *2 indicates the interval between the back surface of the meniscus lens 11 on the side of the object point and the front surface of the second-group lens 21 on the side of the screen, *3 indicates the interval between the back surface of the second-group lens 21 on the side of the object point and the front surface of the third-group first lens 31 on the side of the screen, *4 indicates the interval between the back surface of the third-group second lens 32 on the side of the object point and the front surface of the fourth-group lens 41 on the side of the screen, and *5 indicates the interval between the back surface of the fourth-group lens 41 on the side of the object point and the front surface of the fifth-group lens 51 on the side of the screen.

Figure 4:
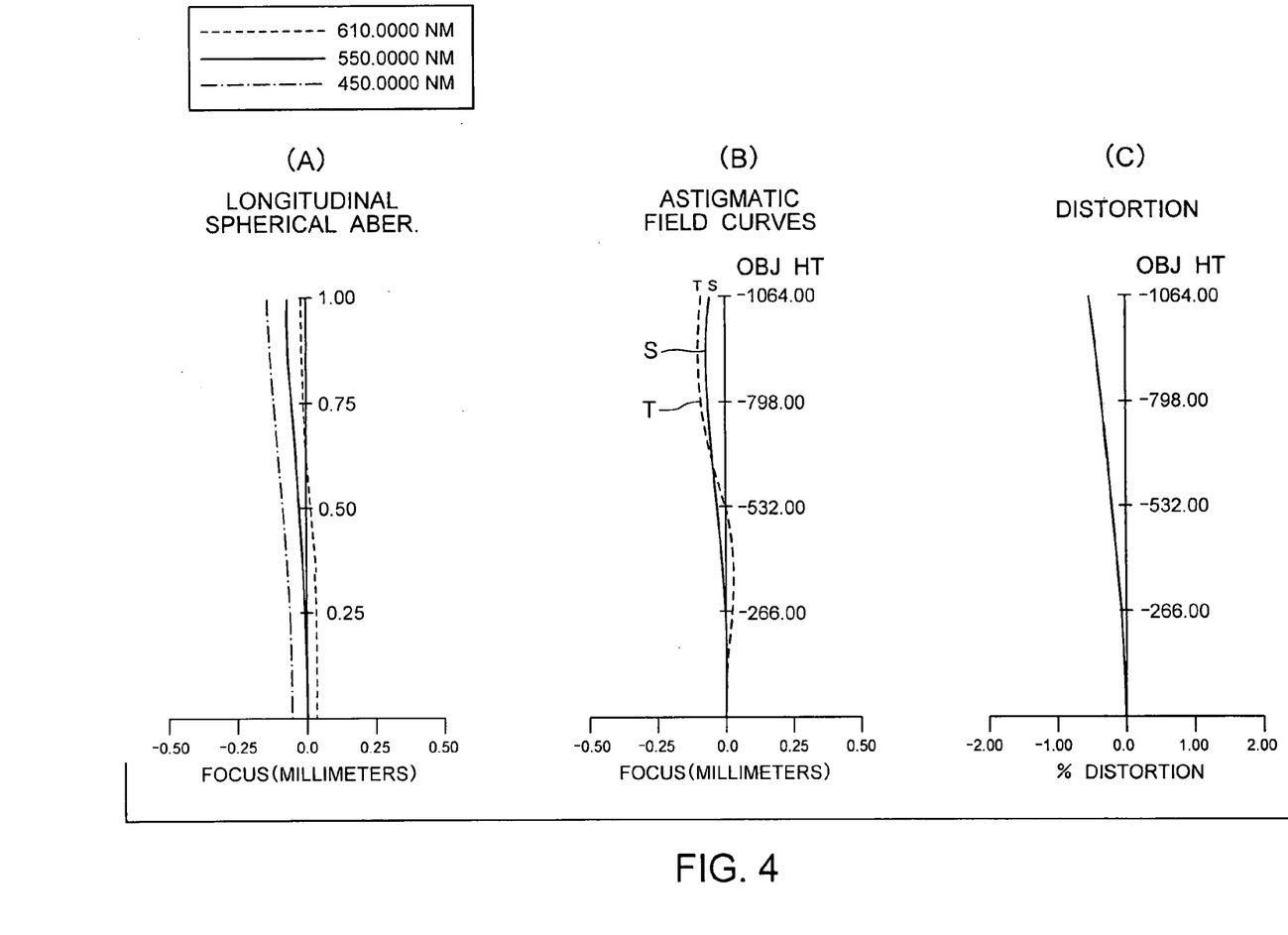
FIGS. 4(A), 4(B) and 4(C) are graphs showing spherical aberration, astigmatism and distortion, respectively, when the projection zoom lens shown in FIG. 1 is set in the telephoto position.
Figure 5:
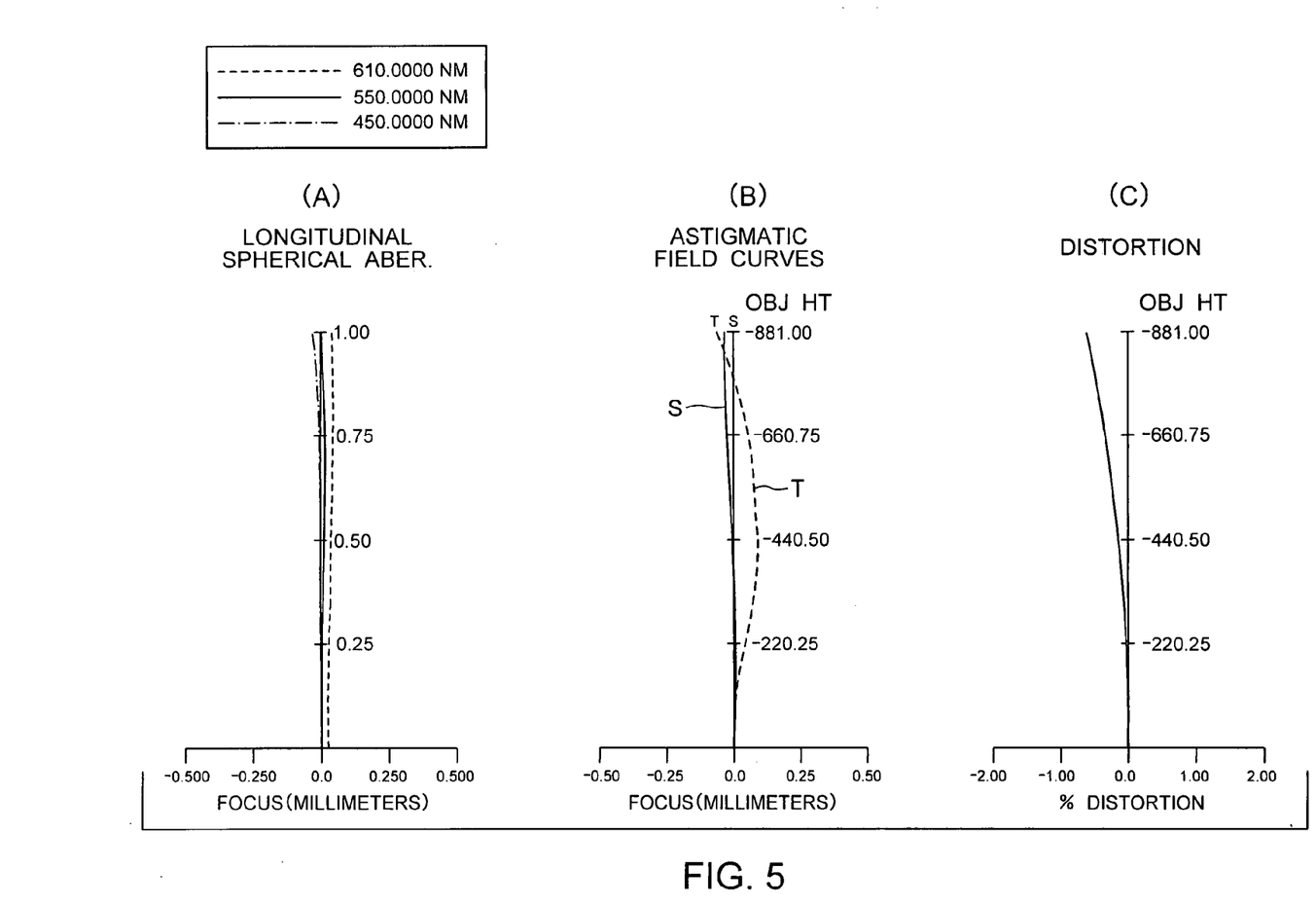
FIGS. 5(A), 5(B) and 5(C) are graphs showing spherical aberration, astigmatism and distortion, respectively, caused by the projection zoom lens shown in FIG. 1 when the projection zoom lens shown in FIG. 1 is set in the telephoto position.
Figure 6:
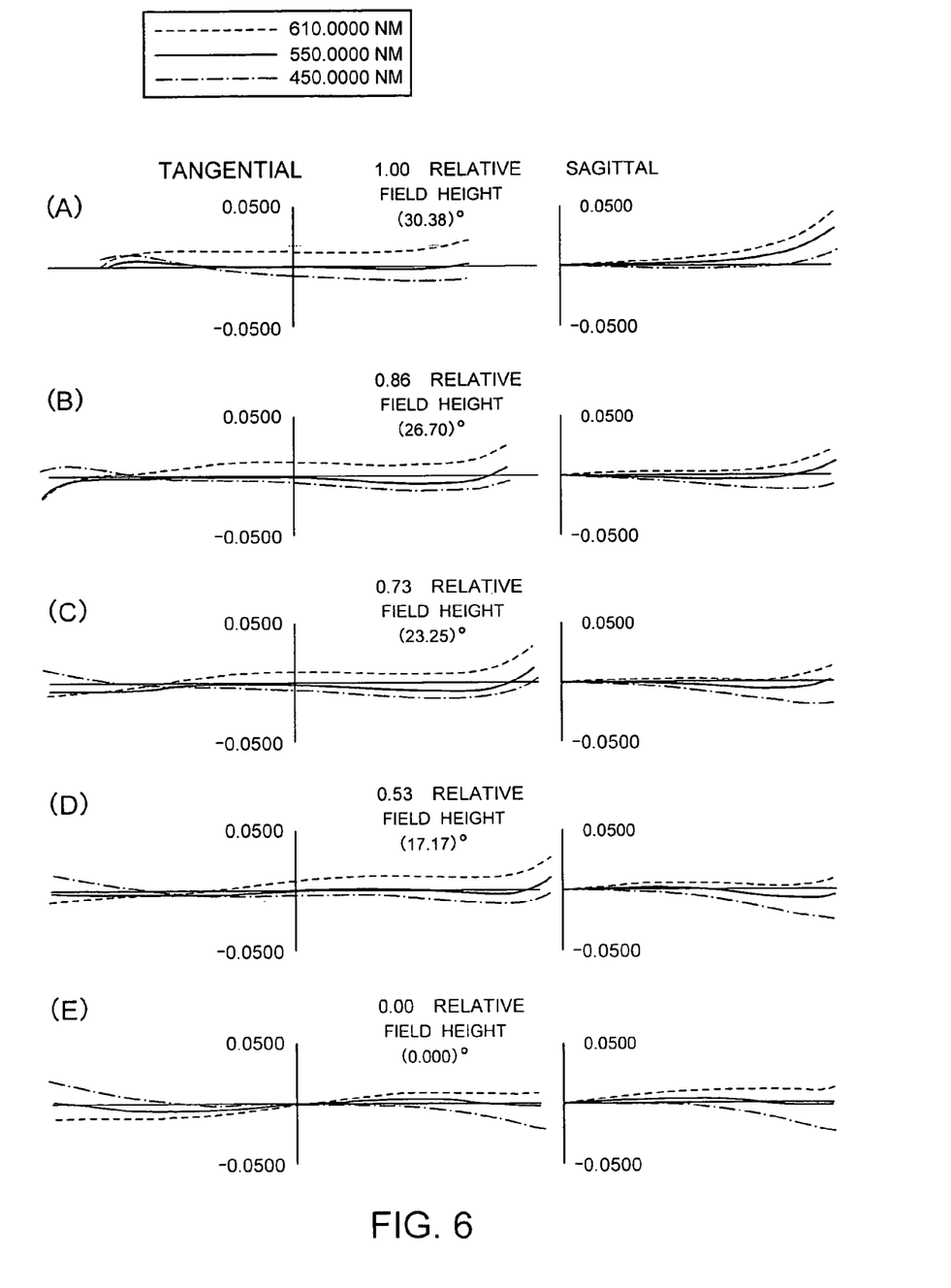
FIGS. 6(A), 6(B), 6(C), 6(D) and 6(E) are graphs showing transverse aberrations caused by the projection zoom lens shown in FIG. 1 set in a wide-angle position for relative field heights of 1.00, 0.86, 0.73, 0.53 and 0.00, respectively.
Figure 7:
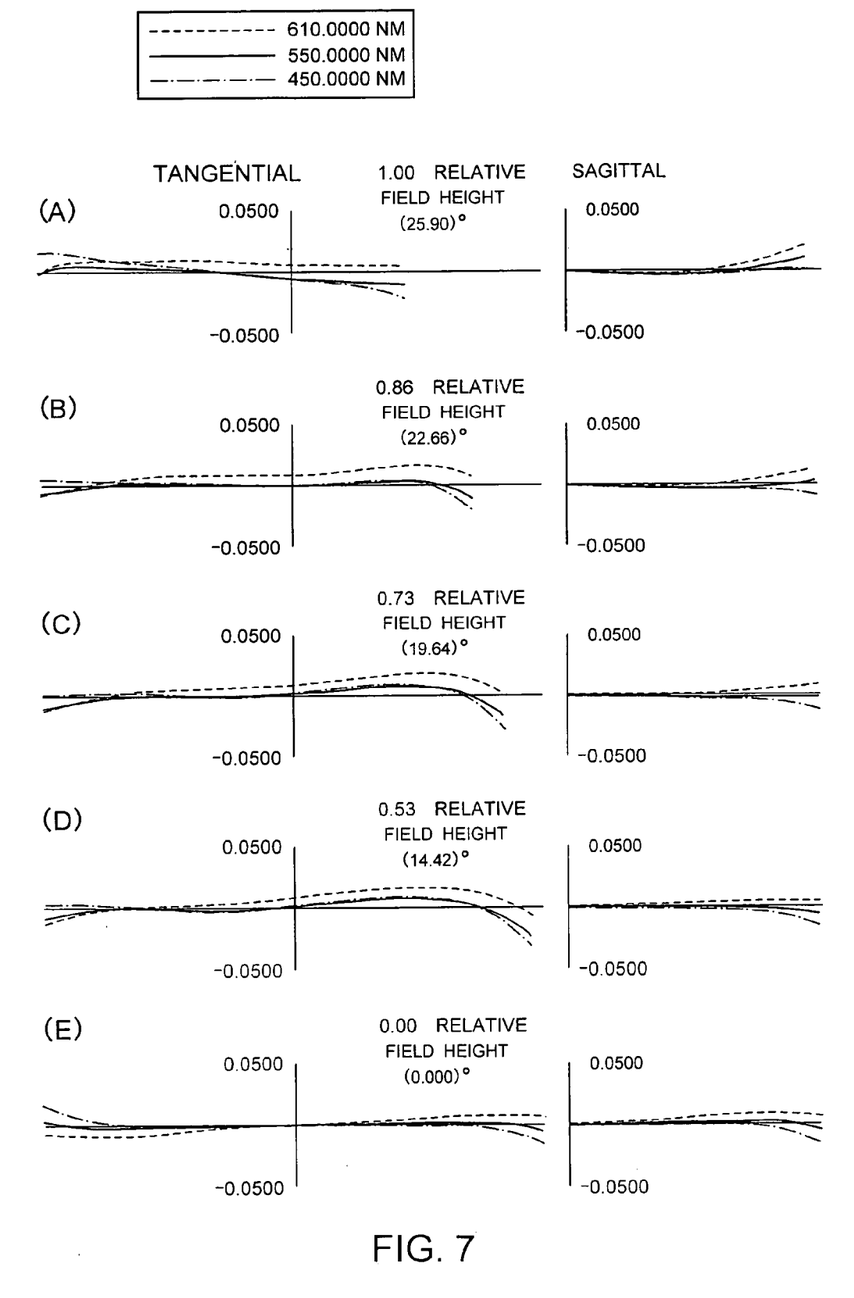
FIGS. 7(A), 7(B), 7(C), 7(D) and 7(E) are graphs showing transverse aberrations caused by the projection zoom lens shown in FIG. 1 set in a telephoto position for relative field heights of 1.00, 0.86, 0.73, 0.53 and 0.00, respectively.

Aberrations caused by the projection zoom lens 2 set in the wide-angle position for the widest angle are shown in FIGS. 4 and 6, and aberrations caused by the projection zoom lens 2 set in the telephoto position are shown in FIGS. 5 and 7. FIGS. 4(A) and 5(A) show spherical aberrations, FIGS. 4(B) and 5(B) show astigmatisms, and FIGS. 4(C) and 5(C) show distortions. Curves S and T in FIGS. 4(B) and 5(B) are astigmatisms with respect to a sagittal image surface and a tangential image surface, respectively. FIGS. 6(A), 6(B), 6(C), 6(D) and 6(E) are graphs showing transverse aberrations caused by the projection zoom lens 2 set in the wide-angle position for relative field heights of 1.00, 0.86, 0.73, 0.53 and 0.00, respectively, and FIGS. 7(A), 7(B), 7(C), 7(D) and 7(E) are graphs showing transverse aberrations caused by the projection zoom lens 2 set in the telephoto position for relative field heights of 1.00, 0.86, 0.73, 0.53 and 0.00 respectively The fifth lens group 50 is kept stationary, and the first lens group 10, the second lens group 20, the third lens group 30 and the fourth lens group 40 are shifted along the optical axis to increase the magnification of the projection zoom lens 2 including the first lens group 10 having a negative refracting power, the second lens group 20 having a positive refracting power, the third lens group 30 having a negative refractive power, the fourth lens group 40 having a positive refracting power, and the fifth lens group 50 having a positive refracting power arranged in that order from the front end on the side of the screen toward the back end on the side of the object point. The first lens group 10 is the single meniscus lens 11 having a convex spherical surface facing the screen and an aspherical surface 11a facing the object point, the second lens group 20 is the single second-group lens 21 having the convex surface facing the screen, the third lens group 30 is the compound lens 30a formed by putting together the biconcave third-group first lens 31 having negative refractive power on the side of the screen, and the biconvex third-group second lens 32 on the side of the object point having the aspherical back surface 32a facing the object point, and cementing the lenses 31 and 32 together, the fourth lens group 40 is the single fourth-group lens 41 having positive refractive power and the convex surface facing the object point, and the fifth lens group 50 is the single biconvex fifth-group lens 51 having positive refracting power. Thus, the projection zoom lens 2 consisting of a comparative small number of lenses, namely the six lenses, has a large half field angle θ of about 30°, and is very satisfactory optical performance of reducing aberrations including spherical aberration, astigmatism and distortion.

The first lens group 10, the second lens group 20, the third lens group 30 and the fourth lens group 40 are shifted on the optical axis toward the screen to increase the magnification of the projection zoom lens 2. Since the first lens group 10 is not kept stationary and is thus moved for zooming up, large field angles and a high aberration reducing characteristic can be maintained for a wide magnification range between the largest and the smallest magnification despite the first lens group 10 being the single meniscus lens 11.

Since the fourth-group lens 41 and the compound lens 30a can be independently shifted for zooming, the fourth-group lens 41 can be freely moved relative to the compound lens 30a and the fifth lens group 50 to correct spherical aberration and to secure the telecentric characteristic at various magnifications by the fourth-group lens 41.

An image is formed on the object point 70 on the right side in FIG. 1 by a film, a slide or a liquid crystal display, and the object surface 70 is projected through the projection zoom lens 2 on the screen.

Figure 8:
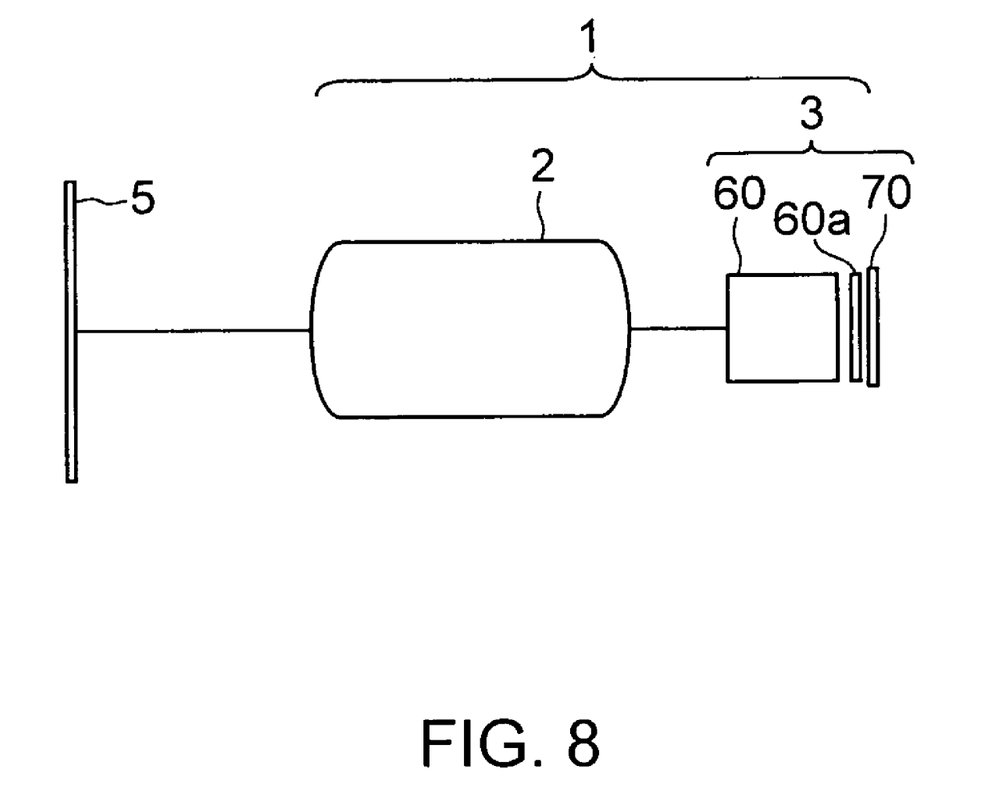
FIG. 8 is an optical projector provided with a projection zoom lens according to the present invention.

An optical projector 1 in a preferred embodiment according to the present invention provided with the foregoing projection zoom lens 2 will be described with reference to FIG. 8.

The optical projector 1 has an image-forming unit 3 for forming color images, and the projection zoom lens 2. The image-forming unit 3 includes three liquid crystal displays, a synthesizing prism 60 for synthesizing three color images formed by the three liquid crystal displays, and an optical member 60a for supporting the synthesizing prism 60 and optical compensation. In FIG. 8, it is supposed typically that images formed by the three liquid crystal displays are displayed by a liquid display disposed on an object surface 70, and the three liquid crystal displays are omitted. An image formed by synthesizing three images formed by the three liquid crystal displays by the synthesizing prism 60 is projected through the projection zoom lens 2 on a screen 5. Since the projection zoom lens 2 is telecentric in a direction from the object surface 70 toward the screen 5, the image can be clearly projected on the screen 5 without being affected by the dependence on angle of the picture quality of the images formed by the liquid crystal displays. The projection zoom lens 2 has a long back focal distance and hence the synthesizing prism 60 can be disposed between the projection zoom lens 2 and the object surface 70.

The image forming unit 3 may include optical modulators, such as devices having micromirrors serving as pixels, films or slides instead of the liquid crystal displays.

The optical projector 1 provided with the projection zoom lens 2 is capable of projecting images in a high picture quality on the screen 5.

As apparent from the foregoing description, according to the present invention, the projection zoom lens has simple construction including practically six lenses, is capable of forming images with small aberrations and has a large field angle, such as a half field angle of about 30°. The optical projector provided with the projection zoom lens is capable of projecting images of a high picture quality on the screen Although the invention has been described in its preferred embodiments with a certain degree f particularity, obviously many changes and variations are possible therein. It is therefore to be understood that the present invention may be practiced otherwise than as specifically described herein without departing from the scope and spirit thereof.

What is claimed is:

1. A projection zoom lens having an optical axis comprising:
    a first lens group having a negative refracting power and disposed at a front end on the side of a screen;
    a second lens group having a positive refracting power disposed behind the first lens group;
    a third lens group having a negative refractive power and disposed behind the second lens group;
    a fourth lens group having a positive refracting power and disposed behind the third lens group; and
    a fifth lens group having a positive refracting power and disposed behind the fourth lens group at a back end on the side of an object point;
    wherein the fifth lens group is kept stationary, and the first, the second, the third and the fourth lens group are shifted along the optical axis in increasing magnification,
    the first lens group includes a single meniscus lens having a convex surface facing the screen and an aspherical surface facing the object point,
    the second lens group includes a single second-group lens having a convex surface facing the screen,
    the third lens group includes a compound lens having a biconcave third-group first lens having a negative refracting power, and a biconvex third-group second lens having an aspherical surface facing the object point, having a positive refracting power and cemented to the back surface on the side of the object point of the third-group first lens,
    the fourth lens group includes a single fourth-group lens having a positive refracting power and having a convex surface facing the object point, and
    the fifth lens group includes a single biconvex fifth-group lens having a positive refracting power.

2. The projection zoom lens according to claim 1, wherein the first to the fifth lens group comprises six lenses virtually.

3. The projection zoom lens according to claim 1, wherein the first, the second, the third and the fourth lens group are shifted toward the screen on the optical axis in increasing magnification.

4. An optical projector comprising:
    an image forming means for producing images; and
    the projection zoom lens according to claim 1 through which an image produced by the image forming means is projected.

5. An optical projector comprising:
    an image forming means for producing images; and
    the projection zoom lens according to claim 2 through which an image produced by the image forming means is projected.

6. An optical projector comprising:
    an image forming means for producing images; and
    the projection zoom lens according to claim 3 through which an image produced by the image forming means is projected.

* * * * *